(12) United States Patent
Satoh et al.

(10) Patent No.: US 6,862,505 B2
(45) Date of Patent: Mar. 1, 2005

(54) VEHICLE-MOUNTED INFORMATION PROCESSING APPARATUS HAVING MAGNETIC DISK DEVICE

(75) Inventors: Naoki Satoh, Odawara (JP); Takashi Yamaguchi, Tsuchiura (JP); Atsushi Saito, Chigasaki (JP); Kozo Nakamura, Hitachiota (JP); Mikio Tokuyama, Tsuchiura (JP); Shigeo Nakamura, Odawara (JP); Hiroyuki Kohida, Zama (JP); Hirohisa Miyazawa, Zama (JP)

(73) Assignees: Hitachi, Ltd., Tokyo (JP); Xanavi Informatics Corporation, Kanagawa (JP)

( * ) Notice: Subject to any disclaimer, the term of this patent is extended or adjusted under 35 U.S.C. 154(b) by 0 days.

(21) Appl. No.: 10/422,943

(22) Filed: Apr. 25, 2003

(65) Prior Publication Data

US 2004/0030472 A1 Feb. 12, 2004

(30) Foreign Application Priority Data

Jul. 1, 2002 (JP) ........................................ 2002-192621

(51) Int. Cl.$^7$ ................................................ G06F 7/00
(52) U.S. Cl. ........................... 701/36; 701/66; 707/205
(58) Field of Search ............................... 701/35, 36, 66; 707/200, 205

(56) References Cited

U.S. PATENT DOCUMENTS

| 3,845,289 | A | 10/1974 | French | |
|---|---|---|---|---|
| 6,182,191 | B1 | * 1/2001 | Fukuzono et al. | .......... 711/111 |
| 6,651,061 | B2 | * 11/2003 | Unchida et al. | ................ 707/9 |

FOREIGN PATENT DOCUMENTS

| JP | 2002-147281 | 5/2002 |
|---|---|---|
| JP | 2001-307450 | 11/2002 |
| WO | 99/09374 | 2/1999 |

* cited by examiner

*Primary Examiner*—Gertrude A. Jeanglaude
(74) *Attorney, Agent, or Firm*—Mattingly, Stanger & Malur, P.C.

(57) ABSTRACT

A vehicle-mounted information processing apparatus such as a car-navigation system detects that a key switch of the vehicle has been set up at a Lock position (i.e., the engine is stopped). After that, the apparatus performs data reproduction of data files in an order from the oldest, then re-recording the reproduced data files with no change added thereto. Here, the above-described data files, which are stored within a magnetic disk device built in the apparatus, have been not updated for a constant time-period. This re-recording prevents a data loss caused by a thermal decay in the case where the magnetic disk device is mounted inside the vehicle that is likely to have existed under a high-temperature environment for a long time-period.

20 Claims, 8 Drawing Sheets

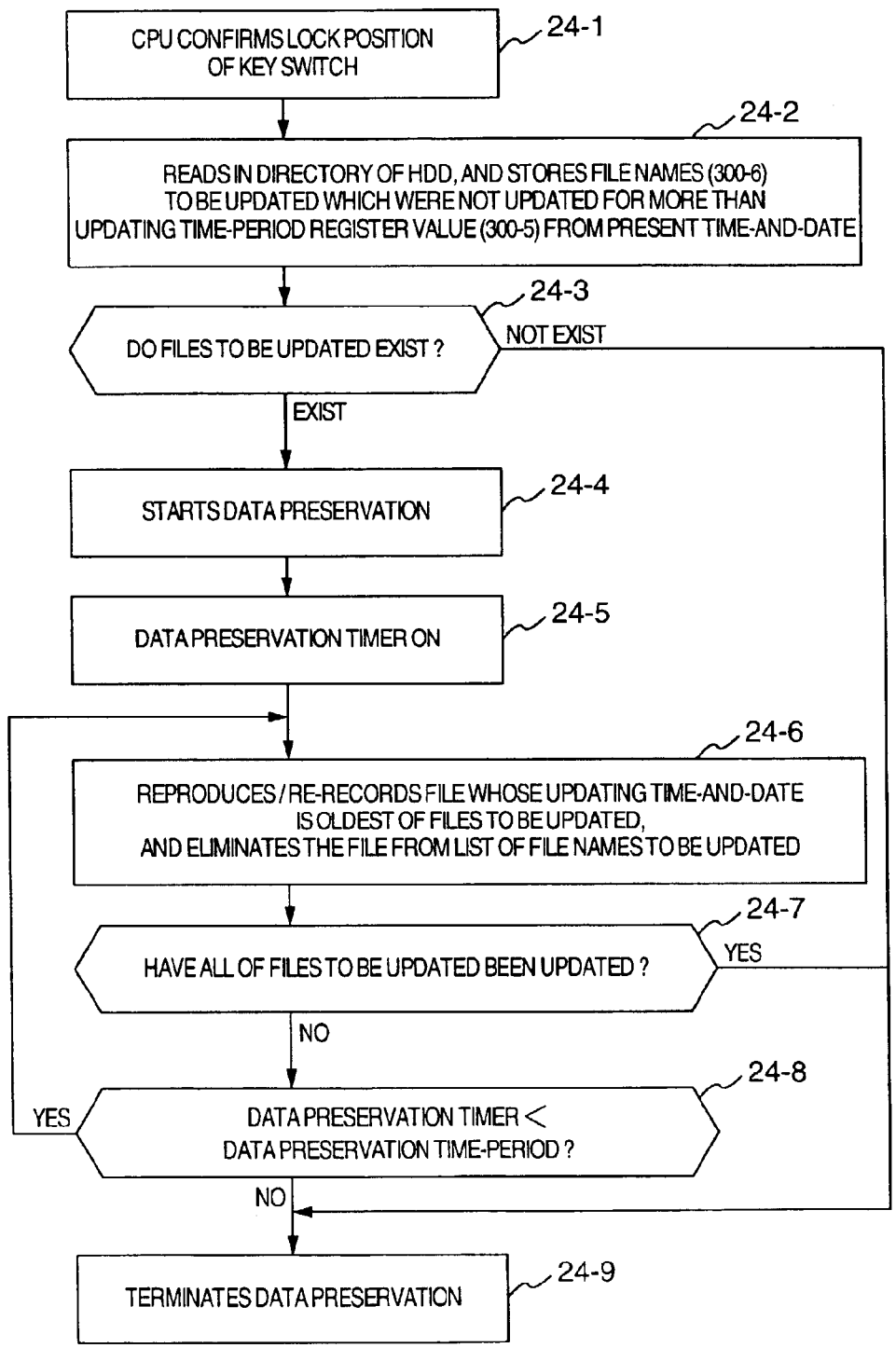

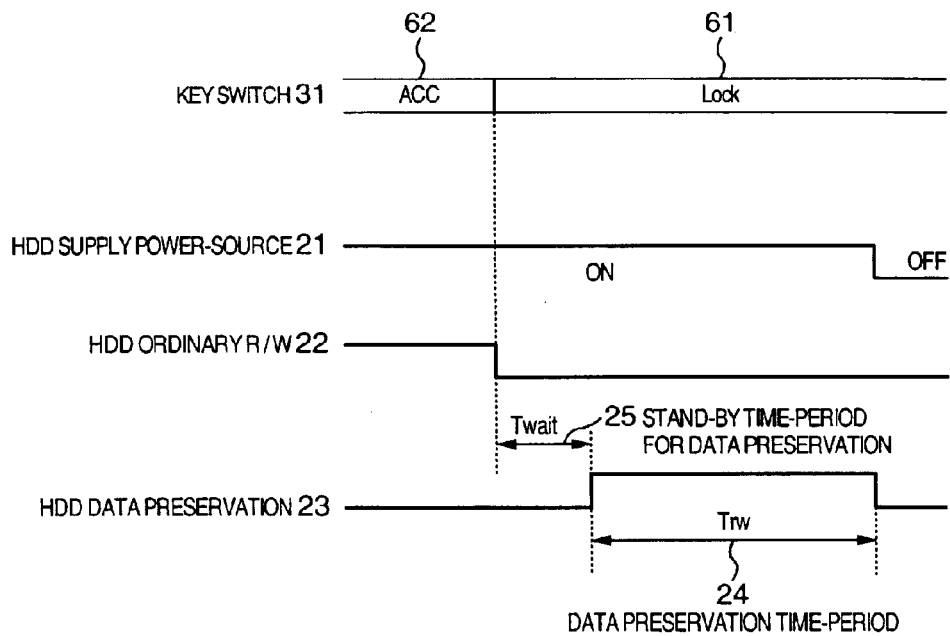
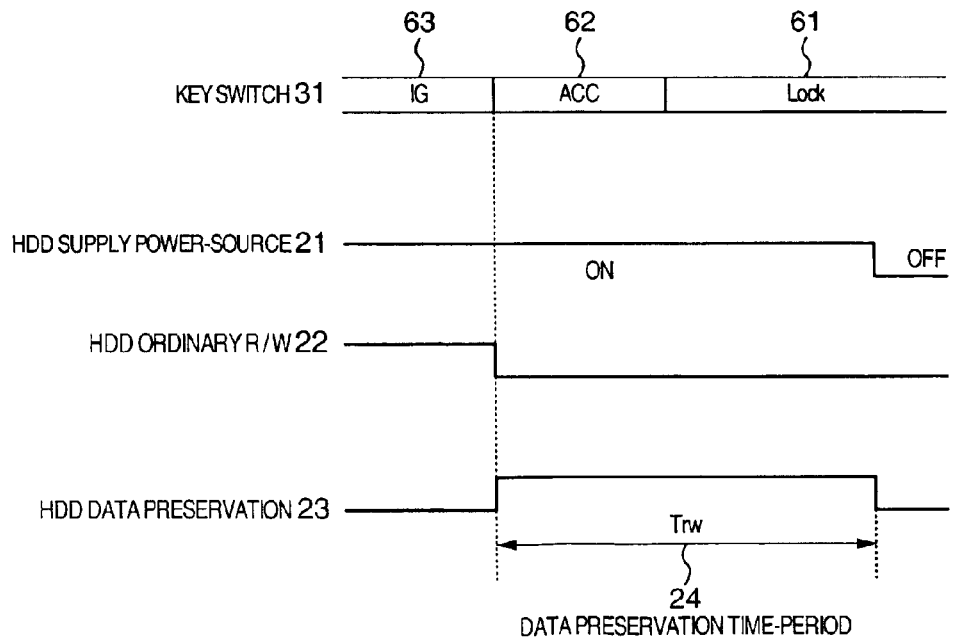

VEHICLE-MOUNTED INFORMATION PROCESSING APPARATUS HAVING MAGNETIC DISK DEVICE

BACKGROUND OF THE INVENTION

The present invention relates to a data preservation technology on a vehicle-mounted magnetic disk device. More particularly, it relates to a vehicle-mounted information processing apparatus that includes a magnetic disk device having a high environment-temperature resistant capability suitable for a car-navigation system.

In recent years, in accompaniment with the implementation of downsizing and high performance of computers, an even smaller-sized and even larger-capacity magnetic disk device has been developed. Also, in a vehicle-mounted information processing apparatus such as a navigation system, it is requested to have not only information such as map information and various types of landmark information, but also an easy-to-use AV function. The existence of this request is now promoting the employment of a magnetic disk device as the information storage that is capable of performing large-capacity and high-speed information accumulation/reproduction, to say nothing of exhibiting high-speed access performance.

By the way, as a record/reproduction surface of the recent magnetic disk, a magnetic thin metal-film that is ten and several nm thick and on-average about 10 nm in particle-diameter has been employed in order to implement several-tens-of-Gbit record density per square inch. As a result, it is becoming increasingly difficult to ensure stability against the heat. For example, the so-called "thermal decay" becomes likely to occur. Here, the thermal decay is a phenomenon that simply causing the high-temperature state to persist results in a decline in the magnetization on the disk surface.

FIG. 9 illustrates the relationship of a residual magnetization with respect to an elapsed time after recording the magnetization, where the environment (conservation) temperature is selected as the parameter. As indicated by a bold line 300-1, there are some cases where, in the data recorded in an environment at about 80° C., an about 15% residual-magnetization decline (i.e., reproduced-amplitude decline) occurs 1000 hours after.

FIG. 10 illustrates the Raw BER (i.e., bit error rate before error correction) with respect to the reproduced amplitude (i.e., residual magnetization). As indicated by a bold line 300-3, there are some cases where, if the residual magnetization declines by about 15%, the Raw BER declines by as much as about 3 orders. Accordingly, a case is likely to occur where even an error correction circuit cannot make the correction.

In, e.g., a HDD built in a personal computer (: PC) or a server system, the upper limit of its operation environment is limited to substantially 50° C. This condition makes the problem of the "thermal decay" comparatively allowable. In the vehicle-mounted information processing apparatus such as the navigation system, however, the temperature within a car left under the blazing sun in summer rises up to the above-described temperature of about 80° C. Consequently, applying the PC-used HDD directly into the navigation system results in even a possibility of causing a fatal problem such as data loss after use for a constant time-period.

Incidentally, there exists JP-A-2001-307450 as a literature that describes a magnetic disk device to be mounted in the car-navigation system. In this literature, in the magnetic disk device that employs a load/unload mechanism as the head saving mechanism, an occurrence of emergency unload operation is prevented which is attributed to a variation in the power-source voltage at the time of starting the engine. This prevention is performed in order to enhance reliability of the vehicle-mounted magnetic disk device.

SUMMARY OF THE INVENTION

As described earlier, when the magnetic disk device according to the background art is used in the vehicle-mounted information processing apparatus such as the car-navigation system or a vehicle-mounted AV appliance, the following problem has been not yet solved: Namely, if there has existed none of an opportunity of being re-recorded while having been exposed to the blazing sun in summer for a long time, it becomes impossible to fetch information from the magnetic disk device.

It is an object of the present invention to provide a data preservation technology on a magnetic disk device and a vehicle-mounted information processing apparatus when the magnetic disk device is mounted on a vehicle. Here, the magnetic disk device is capable of preventing data loss even if the device has been located under a high-temperature environment for a long time.

It is another object of the present invention to suppress a data loss caused by the "thermal decay" or the like when a magnetic disk device is mounted on a vehicle, and thereby to enhance a reliability of the vehicle-mounted magnetic disk device.

It is still another object of the present invention to enhance reliability of a magnetic disk device used in a vehicle-mounted information processing apparatus expected to be located in a harsh temperature environment.

It is further object of the present invention to enhance a reliability of a vehicle-mounted information processing apparatus using a magnetic disk device.

It is even further object of the present invention to enhance reliability of a vehicle that mounts a magnetic disk device.

The present invention provides a vehicle-mounted information processing apparatus including a magnetic disk device and a file updating unit. Here, the file updating unit selects and reproduces (i.e., reads out) a file from among a file group stored in the magnetic disk device, and re-records (i.e., rewrites) the read-out file with no change added thereto, an in-advance determined updating time-period having elapsed since the previous updating of the file.

Also, the present invention provides a magnetic disk device that includes a storage unit for storing time-limit information within which it is required to re-record a file recorded in the magnetic disk device.

More specifically, the vehicle-mounted information processing apparatus of the present invention operates by being configured as follows as one example:

Judging from the condition that a human exists inside the vehicle, it is assumed that the environment temperature in the case where the human operates the vehicle-mounted information processing apparatus will not exceed substantially 40° C. At a point-in-time when the key switch is switched from the accessory (: ACC) position to the Lock position so as to extract the key, this environment temperature is maintained as well.

Consequently, it is preferable that the vehicle-mounted information processing apparatus perform the data updating (i.e., data re-recording while performing the data reproduction: hereinafter referred to as "data preservation operation") of the following data in an order from the oldest: Data that are stored within the magnetic disk device built in the vehicle-mounted information processing apparatus, and that may produce a failure after the Lock position of the key switch (i.e., data that have been not updated for a constant time-period). In this case, in the state where the key switch has been positioned at the ACC position (i.e., the vehicle-mounted information processing apparatus is operated with the engine stopped), no data preservation operation is carried out. This, in operating the vehicle-mounted information processing apparatus, results in none of degradations in the I/O performance of the magnetic disk device.

Also, the time-limit within which performing the re-recording is required because of the "thermal decay" is attached beforehand on the magnetic disk device as visible data, or the time-limit is clearly written beforehand in a product catalogue of the magnetic disk device. This, at a stage of designing the vehicle-mounted information processing apparatus, allows the designer to judge whether or not the magnetic disk device can be integrated into the vehicle-mounted information processing apparatus used under a high environment temperature. This time-limit may also be given with the environment temperature selected as the parameter. It is preferable that the system make reference to this time-limit so as to determine the data that become the target of the above described data preservation operation.

Moreover, times during which the in-vehicle temperature exceeds a constant or more temperature are managed on each constant time-period basis. From these times and the time-limit within which the re-recording is needed, a file to be updated may also be determined. This makes it possible to avoid a useless data preservation operation.

Also, if a time during which the data preservation operation is carried out after the Lock of the key switch is too long, there exists a possibility of causing battery full-discharge of the vehicle to occur. In addition, there exists a possibility that the in-vehicle temperature continues rising and eventually it becomes impossible to guarantee normal operations of the vehicle-mounted information processing apparatus itself and the magnetic disk device mounted thereon. Based on these conditions, the longest time for the data preservation operation may be determined.

Also, immediately after the key switch has been switched to the Lock position, it is allowable to cause the data preservation operation to stand by for a constant time-period. This makes it possible to prevent a degradation in the data preservation operation, which is caused by a vehicle's swaying due to movement of a vehicle's passenger, and by an atmospheric-pressure change at the time of open/close of the door.

Also, even in the state where the key switch has been positioned at the ACC position, the data preservation operation may also be carried out. This increases an opportunity for the data preservation operation and thereby enhances reliability of the data, although the performance of original functions by the vehicle-mounted information processing apparatus may be lowered.

Furthermore, when carrying out the data preservation operation even if the key switch has been positioned at the ACC position, the data preservation operation may be carried out if no access has occurred from the CPU of the information processing apparatus to the magnetic disk device for a constant time-period. This, when the information processing apparatus executes, e.g., an AV function during a stopping of the vehicle, makes it possible to avoid an influence of the data preservation operation on the operation of the AV function.

Other objects, features and advantages of the invention will become apparent from the following description of the embodiments of the invention taken in conjunction with the accompanying drawings.

BRIEF DESCRIPTION OF THE DRAWINGS

FIG. 4 is a flowchart for illustrating an example of the effect of a second embodiment according to the present invention;

FIG. 5 is a timing diagram for illustrating the operation sequence of a third embodiment according to the present invention;

FIG. 6 is a timing diagram for illustrating the operation sequence of a fourth embodiment according to the present invention;

DESCRIPTION OF THE EMBODIMENTS

Figure 1:
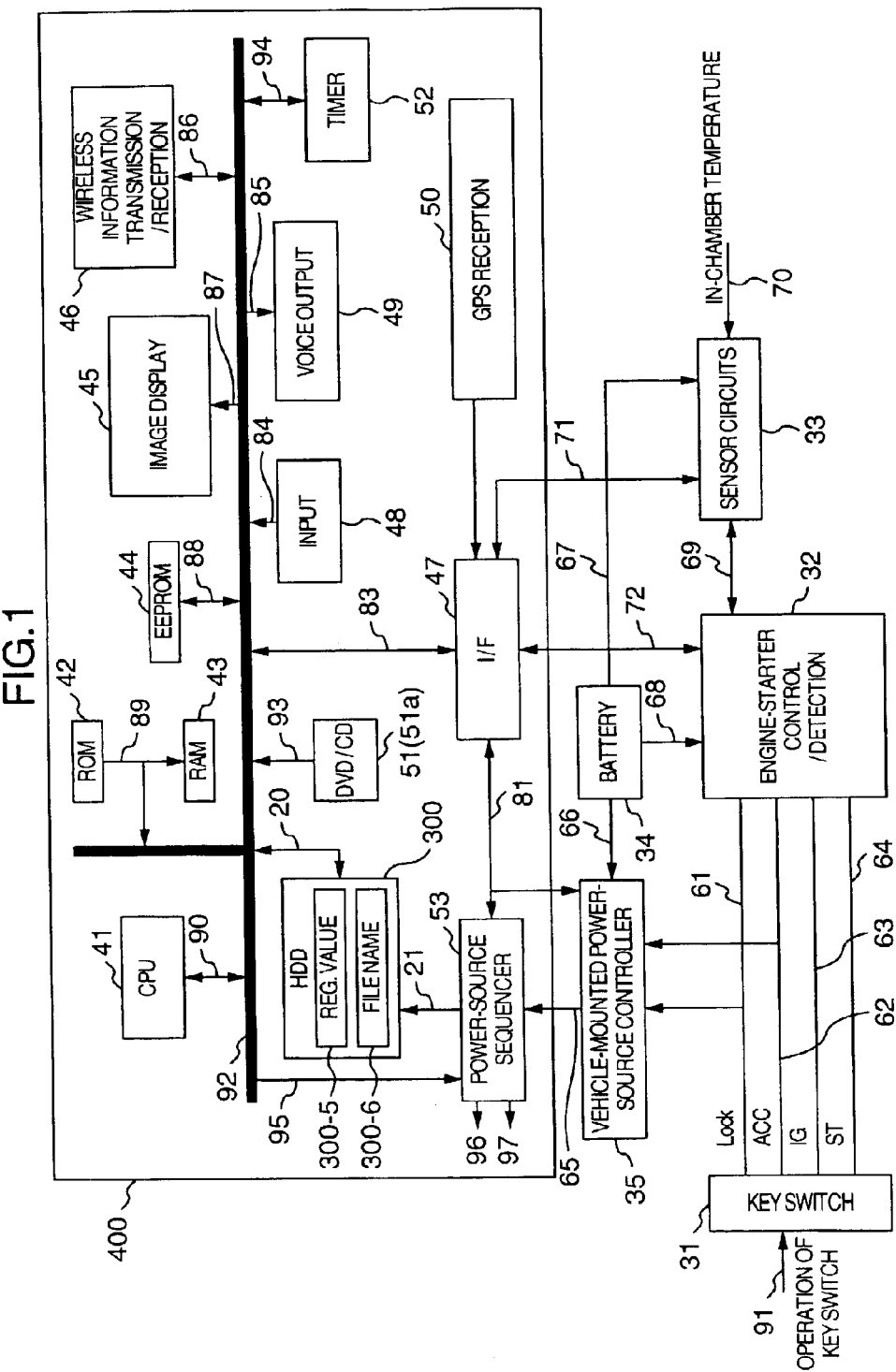
FIG. 1 is a block diagram for illustrating an example of the configuration of a car-navigation system, which is an embodiment of a vehicle-mounted information processing apparatus according to the present invention.

Hereinafter, referring to the drawings, the detailed explanation will be given below concerning embodiments of the present invention.

Using FIG. 1 to FIG. 3, the explanation will be given below concerning a first embodiment of the present invention.

FIG. 1 is a block diagram for illustrating the system configuration of a car-navigation system 400, which is an embodiment of a vehicle-mounted information processing apparatus according to the present invention. Here, map information and audiovisual (: AV) information on the car-navigation system is recorded into a magnetic disk device (i.e., HDD) 300 instead of being recorded into a removable-medium storage device 51a such as a DVD and a CD provided in an audiovisual output device (i.e., AV device) 51. Incidentally, the present invention is also applicable to all of products that, of products accompanying no car-navigation function and equipped with only an AV function, mount the magnetic disk device (i.e., HDD)

thereon. Also, the application range of the present invention does not depend on a driving-power mechanism (e.g., gasoline-driven engine and electric motor) of the vehicle. Namely, the present invention is applicable to both a self-driven vehicle that runs by its own driving power and a vehicle that moves by being pulled.

Figure 8:
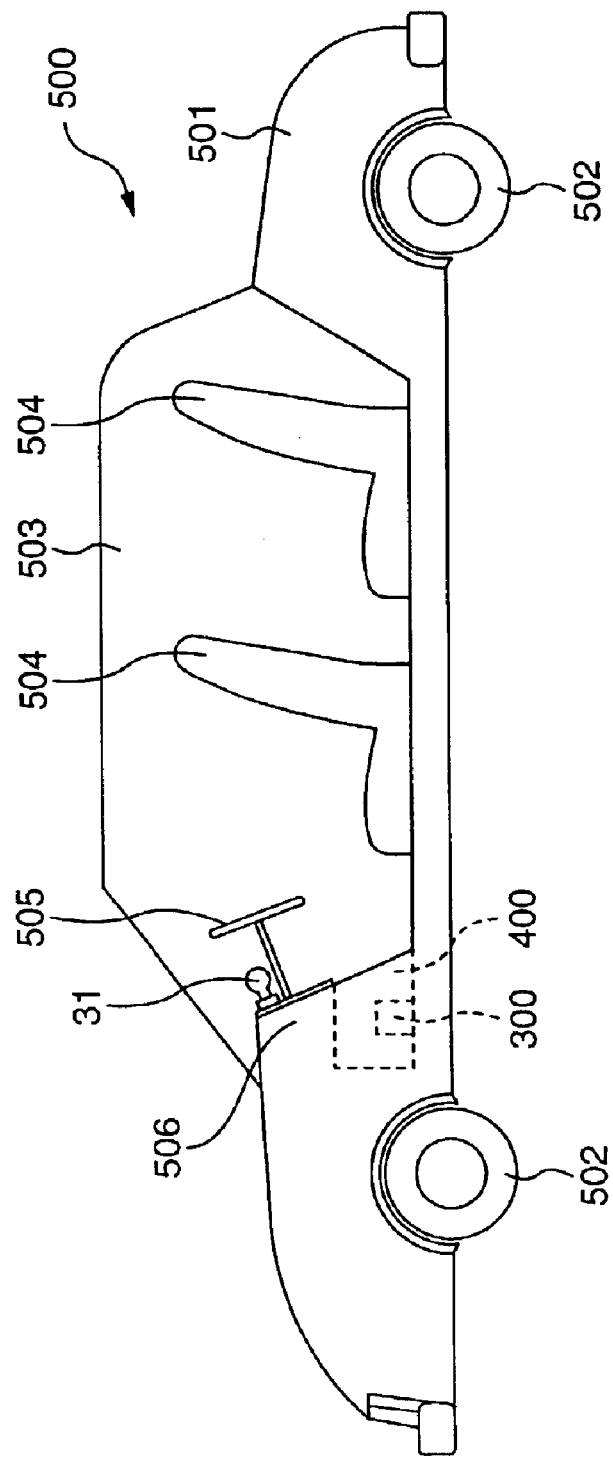
FIG. 8 is a schematic diagram for illustrating a configuration example of a vehicle that mounts thereon the car-navigation system which is the embodiment of the vehicle-mounted information processing apparatus according to the present invention.
Figure 9:
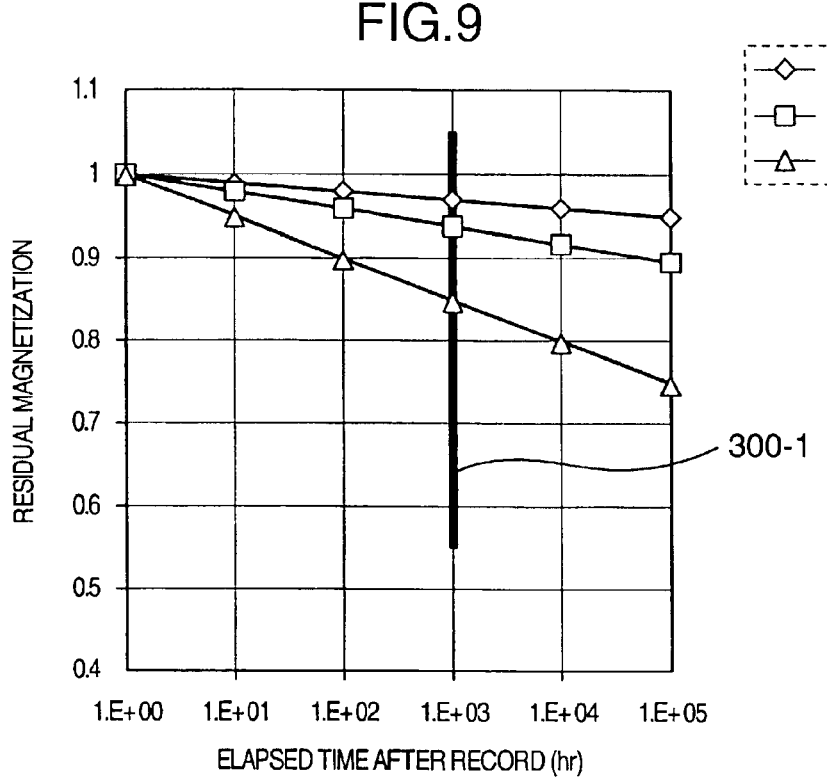
FIG. 9 is a graph for illustrating the relationship between the after-recording elapsed time and the residual magnetization in the magnetic disk device.
Figure 10:
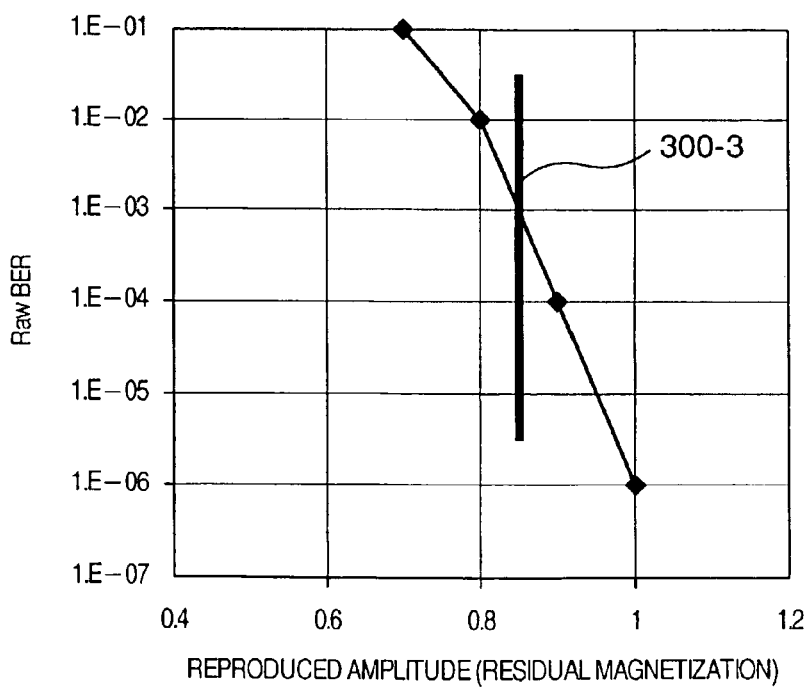
FIG. 10 is a graph for illustrating the relationship between the reproduced amplitude and the Raw BER in the magnetic disk device.

FIG. 8 is a schematic diagram for illustrating an example of the configuration of a vehicle 500 that mounts thereon the car-navigation system 400 in the present embodiment. A main body 501 runs by being self-driven by an engine (not shown) for driving a plurality of wheels 502. Inside a vehicle chamber 503 that a passenger gets on and off through a door (not shown), there are provided each seat 504 for the passenger to sit on, an operating device 505, and a key switch 31.

In the case of the present embodiment, the car-navigation system 400 where the HDD 300 is implemented is mounted within a dash board 506 situated on the front side inside the vehicle chamber 503.

The positions of the key switch 31 include a key-extractable Lock position, an ACC (: accessory) position, an IG (: ignition) position, and a ST (: starter) position. Moreover, rotation of the key switch 31 allows a control over the ON/OFF of power-source supply to attachment appliances such as the car-navigation system 400, and a control over the ON/OFF of power-source supply for the operation of the above-described engine and the starting by a starter.

Now, getting back to FIG. 1, the car-navigation system 400 in the present embodiment includes the following configuration components: A CPU 41 set up as a control center, a ROM 42, a RAM 43, an EEPROM 44, an image display 45, a wireless information transmission/reception device 46, e.g., a portable telephone, an interface (I/F) circuit 47, an input device 48 such as a key board and a remote controller, a voice output device 49 such as an amplifier and a speaker, a GPS reception device 50 for measuring the position of the vehicle on which the system is mounted, the AV device 51 including the removable-medium storage device such as a DVD and a CD, a timer circuit 52, a power-source sequencer 53, and the magnetic disk device (i.e., HDD) 300. Reference numeral 92 denotes a system bus for establishing the connection between the CPU 41 and the devices controlled thereby.

In FIG. 1, numerals 66 to 68 denote power-source lines from a battery 34 to the respective components. Also, numerals 69, 71, 72, 81, 83, 84, 85, 86, 87, 88, 89, 90, 93, and 94 denote signal lines.

In the present embodiment, in addition to these configuration components, the following components are indicated: The key switch 31 of the vehicle on which the car-navigation system 400 is mounted, an engine-starter control/detection circuit 32, respective types of sensors 33 for detecting information such as an in-chamber temperature 70 of the vehicle, the battery 34, and a vehicle-mounted power-source control circuit 35.

The execution of a key-switch operation 91 permits the key switch 31 to select the 4 positions, i.e., the Lock/the ACC (: accessory)/the IG (: ignition)/the ST (: starter). The extraction/insertion of the key is carried out at the Lock position. The key positions 61 to 64 of the key switch 31 allow a control over the engine-starter control/detection circuit 32. Also, the key positions 61 to 62 allow the vehicle-mounted power-source control circuit 35 to control a power-source 65 to be supplied to the car-navigation system 400 or the like from a power 66 supplied from the battery 34. The power-source sequencer 53 inside the car-navigation system 400 controls not only the ON/OFF timing of a HDD supply power-source 21 to be supplied to the HDD 300, but also the ON/OFF timings of a power-source 96 and a power-source 97 to be supplied to the other circuit blocks.

Using the RAM 43 as the work area and based on programs stored in the ROM 42 and the EEPROM 44, the CPU 41 performs the control over the entire navigation. In addition to this control, the CPU 41 performs controls over the following respective units connected to the system bus 92: The image display 45, the wireless information transmission/reception device 46, the I/F circuit 47, the input device 48, the voice output device 49, the GPS reception device 50, the AV device 51 including the removable-medium storage device such as the DVD/CD, the timer circuit 52, and the power-source sequencer 53.

Furthermore, in the case of the present embodiment, using the RAM 43 as the work area and based on a control program (i.e., file updating unit) stored in the ROM 42 and the EEPROM 44, the CPU 41 executes a data preservation operation in the HDD 300 as will be described later.

Figure 7:
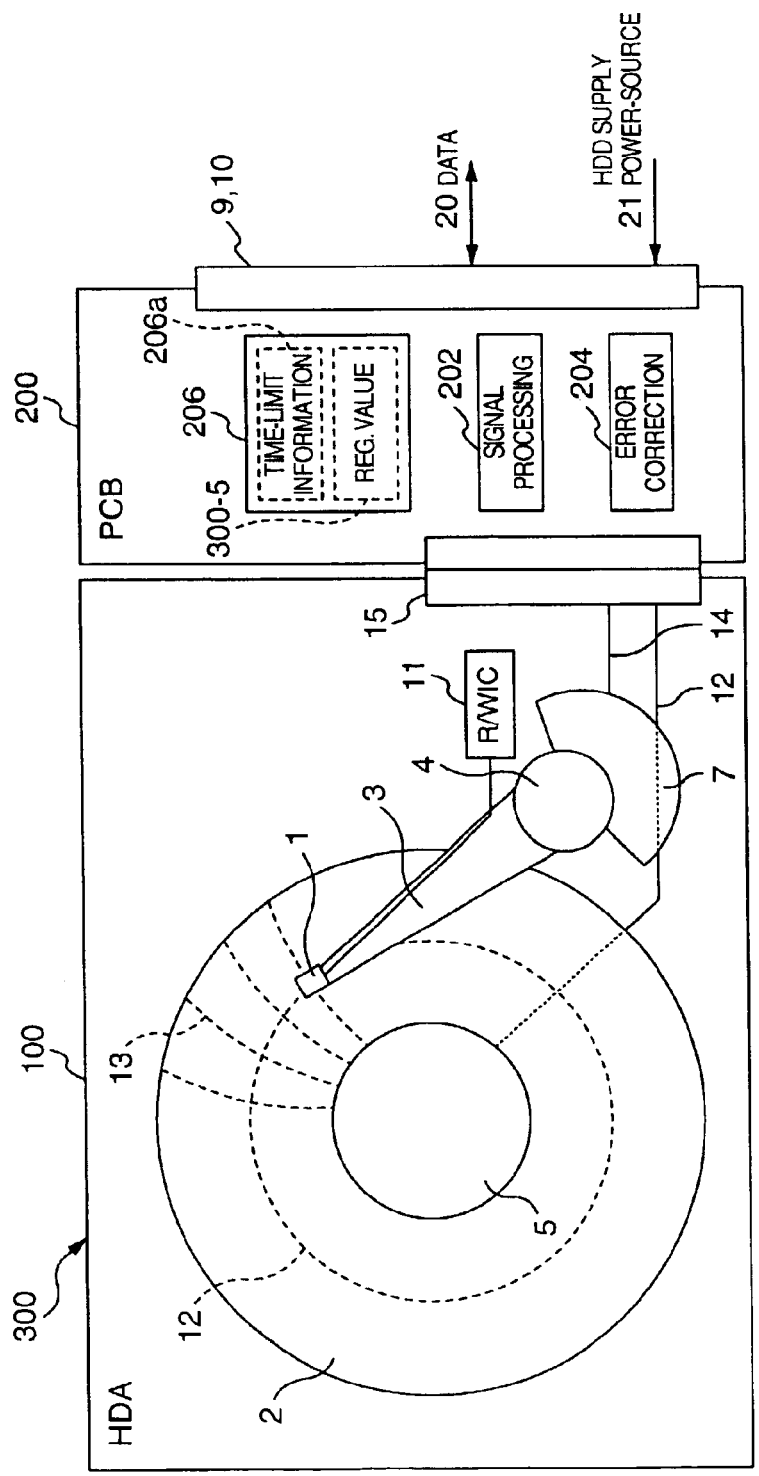
FIG. 7 is a schematic diagram for illustrating an example of the configuration of a magnetic disk device implemented in the car-navigation system, which is the embodiment of the vehicle-mounted information processing apparatus according to the present invention.

Here, FIG. 7 illustrates an example of the configuration of the HDD 300 mounted on the car-navigation system 400 in the present embodiment. Roughly divided, the HDD 300 in the present embodiment includes a head disk assembly (: HDA) 100, which is basically a mechanism system, and a package circuit board (: PCB) 200, which is basically a circuit system. The HDA 100 is substantially sealed, which is a configuration that makes it unlikely that dust will enter the HDA. The head disk assembly (: HDA) 100 basically includes a magnetic disk 2 integrated via a spindle 5, a magnetic head 1 fixed onto a front edge of a suspension 3 connected to an actuator 4 driven by a voice coil motor (: VCM) 7, and a read/write IC (: R/W IC) 11 for electrically driving the magnetic head 1. The magnetic head 1 is displaced (i.e., seek operation 13) via the VCM 7 while rotating the magnetic disk 2 at a constant rotational speed or rpm. This makes it possible to record/reproduce data at an arbitrary position on concentrically-circular tracks 12. An analogue output that corresponds to a residual magnetization of the R/W IC 11 is demodulated/error-corrected by a signal processing circuit 202 and an error correction circuit 204 mounted on the PCB 200, then being sent out as data 20 to higher-order appliances via an interface connector 9 and the system bus 92. Also, the HDD supply power-source 21 is supplied to the HDD from the power-source sequencer 53 via a power-source connector 10.

In the case of the present embodiment, at the time of the plant shipment and based on the specification of the HDD 300, time-limit information 206a within which performing a re-recording (i.e., data preservation operation) is necessary can be stored into an EEPROM 206 mounted on the package circuit board (: PCB) 200, or into a part of the magnetic disk 2.

Figure 2:
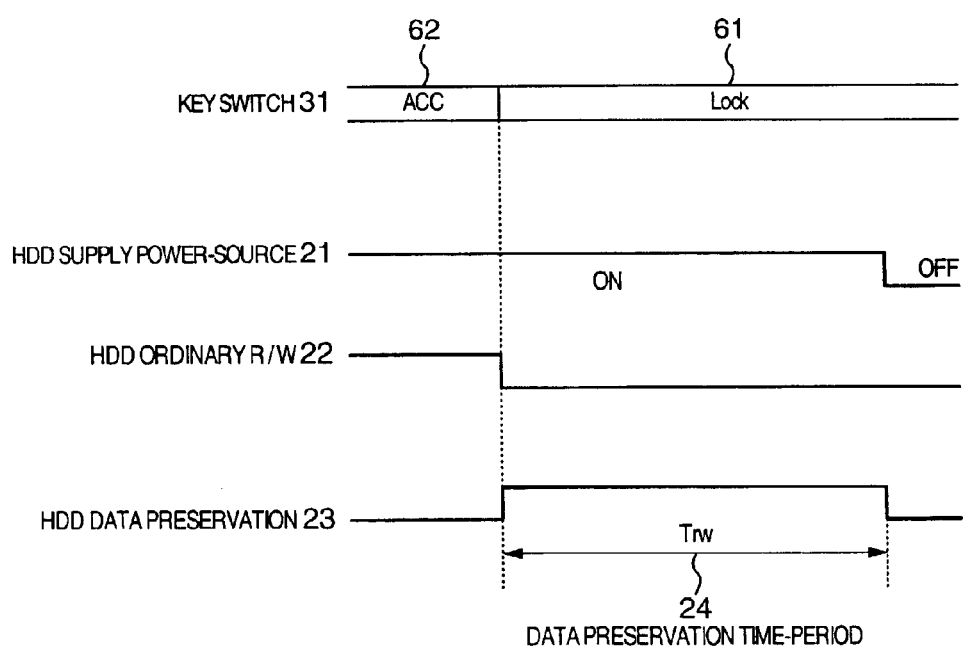
FIG. 2 is a timing diagram for illustrating the operation sequence of a first embodiment according to the present invention.

FIG. 2 illustrates the sequence of the data preservation operation. At a point-in-time when the key switch 31 is switched from the ACC position 62 to the Lock position 61, the CPU 41 causes the HDD 300 to terminate an ordinary record/reproduction operation 22. Simultaneously, the CPU starts up a data preservation operation 23 (i.e., reproducing data files that become the targets, and re-recording the data files just as they are). Incidentally, the data preservation operation 23 may include an operation of verifying whether or not the read-out files have been able to be rewritten correctly. Moreover, at a point-in-time when re-recording all the data files to be re-recorded has been completed, the CPU terminates a data preservation operation time-period 24. Simultaneously, the CPU 41 ceases the data preservation operation 23, stopping the HDD supply power-source 21 supplied to the HDD 300. Additionally, the data files within the HDD 300 that become the targets of the data preservation operation 23 are data files from whose last updating time-and-date a constant time-period T (i.e., updating time-period register value 300-5: set up in advance in the magnetic disk 2 or the EEPROM 44) or more time has elapsed. The value of this constant time-period T is set up based on the time-limit information 206*a* within which performing the re-recording is necessary, or on a catalogue value of the HDD 300. Here, the time-limit information has been stored in the EEPROM 206 inside the package circuit board (: PCB) 200 in the HDD 300.

Figure 3:
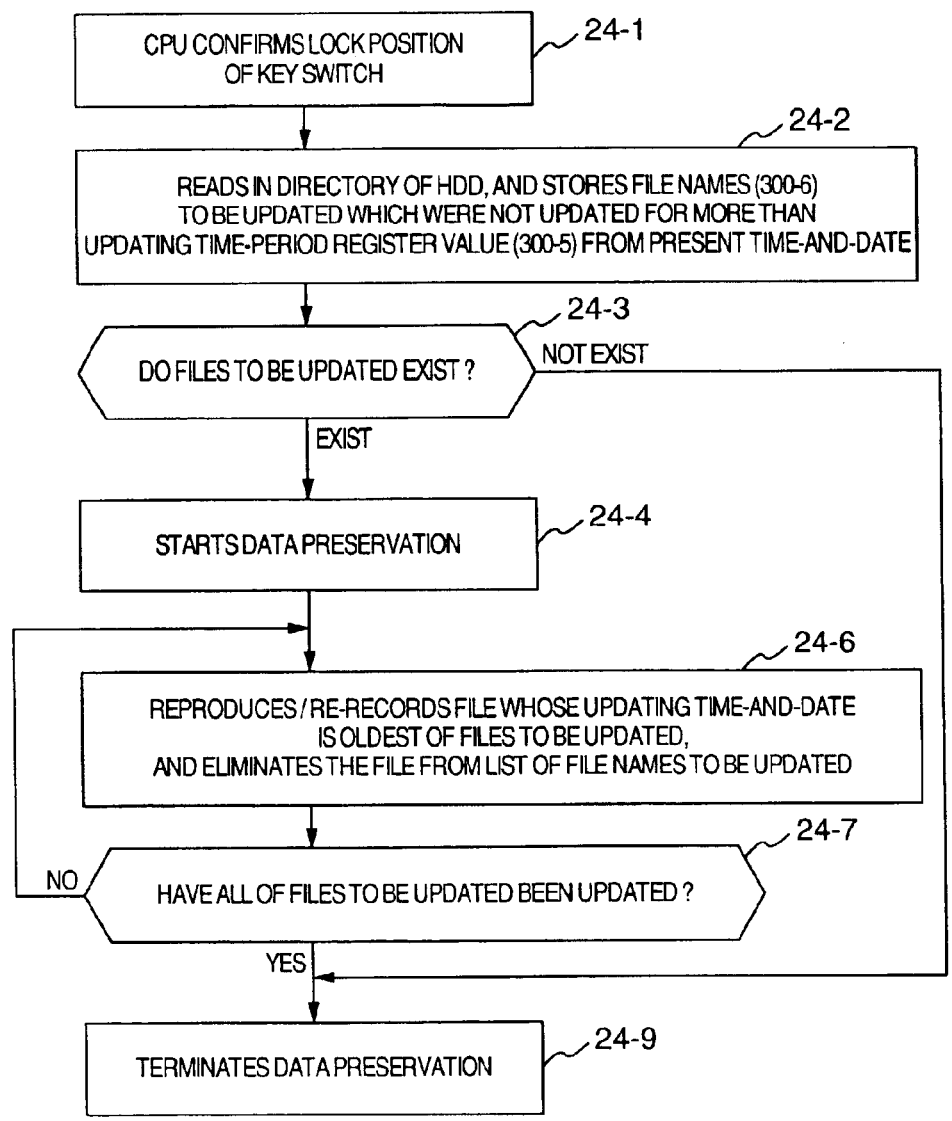
FIG. 3 is a flowchart for illustrating an example of the effect of the first embodiment according to the present invention.

FIG. 3 illustrates the detailed sequence of the data preservation operation 23 at this time. The CPU 41 confirms the Lock position 61 of the key switch 31 via the I/F circuit 47 (step 24-1). Then, the CPU 41 reads in the directory of the HDD 300, thereby storing file names 300-6 that were not updated for more than a time-period of the updating time-period register value 300-5 from the present time-and-date, i.e., the file names that should be updated (step 24-2). Next, the CPU checks whether or not there exist files to be updated (step 24-3). If there exist no files to be updated, the CPU terminates the data preservation operation 23 (step 24-9). Meanwhile, if there exist the files to be updated, the CPU starts the data preservation operation 23 (step 24-4). Moreover, the CPU reproduces/re-records a file whose updating time-and-date is the oldest of the files to be updated, then eliminating the file from the list of the file names to be updated (step 24-6). Furthermore, the CPU checks whether or not all of the files to be updated have been updated (step 24-7). If all of the updatings have been not finished, the CPU repeats the step 24-6. Mean while, if all of the updatings have been finished (i.e., all of the files have been updated already), the CPU terminates the data preservation operation 23 (step 24-9).

Here, it is desirable that the updating time-period register value 300-5 be equal to several hundreds to several thousands hours.

Incidentally, the time-limit (i.e., the time-limit information 206*a*) within which performing the re-recording is necessary because of the "thermal decay" may also be stored as data into the magnetic disk 2 in the HDD 300. This time-limit may also be given with the environment temperature selected as the parameter. In this case, it is preferable that the CPU 41 make reference to this time-limit so as to set up this time-limit into the updating time-period register value 300-5.

In addition, times during which the in-chamber temperature exceeds a constant or more temperature are managed by the timer circuit 52 on each constant time-period (e.g., 1 week, 1 month) basis. From these times and the updating time-period register value 300-5, the data preservation operation time-period (: Trw) 24 may also be determined. This makes it possible to avoid a useless data preservation operation.

In the present embodiment, from a condition that a human exists inside the vehicle, the environment temperature in the case where the human operates the car-navigation system 400 does not exceed substantially 40° C. At the point-in-time when the key switch 31 is switched further to the Lock position 61 via the ACC position 62 so as to extract the key, the in-chamber environment temperature usually does not exceed substantially 40° C., since the human exists inside the vehicle in the meantime as well. Accordingly, carrying out the data preservation operation in the HDD 300 immediately after this point-in-time allows the data preservation operation to be executed without undergoing influences of vibrations due to the environment temperature and the running, vibration of the engine, vibrations due to the audio appliances, and the like. This makes it possible to implement a higher-reliability data preservation. Namely, in the present invention, the operation itself of switching the key switch 31 from the ACC position to the Lock position is utilized as a sensor for indicating that there exists a human inside the vehicle at the time of or immediately after this operation. Consequently, if there exists a sensor for detecting whether or not the driver has performed the operation of extracting the key, or for detecting whether or not there exists a human inside the vehicle, the carrying-out of the data preservation operation is possible in a manner responding to an output from this sensor.

Also, let's consider the following case: In the state where the key switch 31 has been positioned at the ACC position 62 (i.e., the engine is stopped, but the vehicle-mounted information processing apparatus such as the car-navigation system 400 can be operated), no data preservation operation is carried out. In this case, there occurs none of degradations in the I/O performance in operating the car-navigation system 400.

Whether or not the above-described data preservation operation in the present embodiment is being carried out can be confirmed by checking, in the state where the key switch 31 has been positioned at the Lock position 61, the presence or absence of an electric current in the HDD supply power-source 21 to be supplied to the HDD 300. Accordingly, based on this method, it is possible to perform a light-up control over a lamp for indicating whether or not the data preservation operation is under execution.

Namely, at the above-described step 24-2, in order to make judgement as to whether or not it is necessary to execute the data preservation operation, the access to the HDD 300 occurs and thus the HDD 300 comes into its operation state. Consequently, if the supply of the above-described electric current to the HDD 300 is detected in the state where the key switch 31 has been positioned at the Lock position 61, it can be assumed that the present invention is being carried out.

Otherwise, before switching the key switch 31 to the Lock position 61, a file list A of the files in the directory of the HDD 300 is outputted with time stamps attached thereon which indicate the final updating point-in-times. After that, the key switch 31 is switched into the state of the Lock position 61, then being left alone. Still after that, a file list B of the files in the directory of the HDD 300 is outputted with time stamps attached thereon again. Then, if, between the file list A and the file list B, file names whose time stamps are the oldest differ from each other, it can be assumed that the data preservation operation of the present invention has been carried out.

Next using FIG. 4, explanation will be given below concerning a second embodiment of the present invention.

A block diagram for illustrating the system configuration of a car-navigation system in the present embodiment is the same as the one in FIG. 1. What differs from the first embodiment lies in a point that the maximum value of the data preservation operation time-period is specified.

FIG. 4 illustrates the detailed sequence of the data preservation operation 23. The CPU 41 confirms the Lock position 61 of the key switch 31 via the I/F circuit 47 (step 24-1). Then, the CPU 41 reads in the directory of the HDD 300, thereby storing the file names 300-6 that were not updated for more than the time-period of the updating time-period register value 300-5 from the present time-and-date, i.e., the file names that should be updated (step 24-2). Next, the CPU checks whether or not there exist the files to be updated (step 24-3). If there exist no files to be updated, the CPU terminates the data preservation operation 23 (step 24-9). Meanwhile, if there exist the files to be updated, the CPU starts the data preservation operation 23 (step 24-4), thus starting up the data preservation operation timer (i.e., the timer circuit 52) (step 24-5). Moreover, the CPU reproduces/re-records the file whose updating time-and-date is the oldest of the files to be updated, then eliminating the file from the list of the file names to be updated (step 24-6). Furthermore, the CPU checks whether or not all of the files to be updated have been updated (step 24-7). If all of the updatings have been finished (i.e., all of the files have been already updated), the CPU terminates the data preservation operation 23 (step 24-9). Meanwhile, if all of the updatings have been not finished, the CPU checks whether or not the timer circuit 52 is less than an upper-limit set-up value 52a of the data preservation operation time-period (step 24-8). If the timer circuit is less than the set-up value, the CPU repeats the step 24-6. Meanwhile, if the timer circuit is more than the set-up value, the CPU terminates the data preservation operation 23 (step 24-9).

Here, it is desirable that the updating time-period register value 300-5 be equal to several hundreds to several thousands hours.

It is desirable that the upper-limit set-up value 52a of the data preservation operation time-period at this time be equal to several tens of seconds to several tens of minutes.

According to the present embodiment, in addition to the effects by the 1st embodiment, the upper-limit of the one-time data preservation operation time-period is specified. This makes it possible to prevent battery full-discharge caused by a long-time data preservation operation, and further to exclude the factor that results in a phenomenon that the normal operation of the HDD 300 is hindered by a rise in the in-vehicle temperature due to the environment temperature.

Next, using FIG. 5, explanation will be given below concerning a third embodiment of the present invention.

A block diagram for illustrating the system configuration of a car-navigation system in the present embodiment is the same as the one in FIG. 1. What differs from the first embodiment lies in a point that a stand-by time for the data preservation operation is specified after the key switch 31 has been switched to the Lock position 61.

At the point-in-time when the key switch 31 is switched from the ACC position 62 to the Lock position 61, the CPU 41 causes the HDD 300 to terminate the ordinary record/reproduction operation 22. Simultaneously, the CPU causes the data preservation operation 23 to stand by for the time-period of a stand-by time (: Twait) 25 for the data preservation. After this stand-by time has elapsed, the CPU starts up the data preservation operation 23 (i.e., reproducing and re-recording the data files that become the targets). Moreover, at a point-in-time when re-recording all the data files to be re-recorded has been completed, the CPU terminates the data preservation operation time-period 24. Simultaneously, the CPU 41 ceases the data preservation operation 23, stopping the HDD supply power-source 21 supplied to the HDD 300.

Here, it is desirable that the updating time-period register value 300-5 be equal to several hundreds to several thousands hours.

It is desirable that the stand-by time (: Twait) 25 for the data preservation be equal to several seconds to several tens of seconds. This is equivalent to a time that elapses until all the passengers have gotten off the vehicle from the point-in-time when the key switch 31 had been switched to the Lock position.

According to the present embodiment, the stand-by time is set up within a time that elapses until the data preservation operation was started up from the point-in-time when the key switch 31 had been switched to the Lock position. This makes it possible to prevent a degradation in the data preservation operation. Here, the degradation is likely to occur, since the record/reproduction operation by the HDD 300 is disturbed by a vehicle's swaying due to movement of the vehicle's passengers, and by an atmospheric-pressure change at the time of open/close of the door.

Next, using FIG. 6, explanation will be given below concerning a fourth embodiment of the present invention.

A block diagram for illustrating the system configuration of a car-navigation system in the present embodiment is the same as the one in FIG. 1. What differs from the embodiment described earlier lies in a point that the data preservation operation is carried out in a state where the key switch 31 is positioned at the accessory (: ACC) position 62.

At a point-in-time when the key switch 31 is switched from the ignition (: IG) position 63 to the ACC position 62, the CPU 41 causes the HDD 300 to terminate the ordinary record/reproduction operation 22. Simultaneously, the CPU starts up the data preservation operation 23 (i.e., reproducing and re-recording the data files that become the targets). Then, even if the key switch 31 is switched to the Lock position 61 during the data preservation operation, the CPU continues the data preservation operation. Moreover, at a point-in-time when re-recording all the data files to be re-recorded has been completed, the CPU terminates the data preservation operation time-period 24. Simultaneously, the CPU 41 ceases the data preservation operation 23, stopping the HDD supply power-source 21 supplied to the HDD 300.

Here, it is desirable that the updating time-period register value 300-5 be equal to several hundreds to several thousands hours.

This increases an opportunity for the data preservation operation, thereby enhancing reliability of the data.

Also, when the key switch 31 is switched to the ACC position 62, the CPU 41 checks the operation state of the HDD 300, thereby confirming a state where no access has occurred for a constant time-period (: an order of several seconds). After that, the CPU may start up the data preservation operation 23. If the key switch 31 is switched to the Lock position 61 during this confirmation of the HDD 300's operation, the CPU can start the data preservation operation. This, when performing an AV processing using the HDD 300 during a stopping of the vehicle, makes it possible to avoid influences on the image and voice exerted by the carrying-out of the data preservation operation.

As having been explained so far, according to the above-described respective embodiments of the present invention, when the magnetic disk device is mounted on a vehicle, it becomes possible to provide the data preservation technology on the magnetic disk device and the vehicle-mounted information processing apparatus. Here, even if the magnetic disk device has been located under a high-temperature environment for a long time-period, the magnetic disk device is capable of preventing data loss caused by the "thermal decay" of the magnetization state in the magnetic disk 2 which is a magnetic storage medium.

So far, based on the embodiments, specific explanation has been given concerning the invention devised by the present inventor. It is needless to say, however, that the present invention is not limited to the above-described embodiments, but can be modified in a variety of ways without departing from its essence and spirit.

The vehicle-mounted information processing apparatus is not limited to an attachment appliance such as the car-navigation system, and thus the present invention may also be applied to a vehicle-mounted information processing apparatus of a vehicle control system for performing the operation/management of the vehicle itself.

What is claimed is:

1. A vehicle-mounted information processing apparatus, comprising:

a magnetic disk device storing a plurality of files each having a file name and a date/time at which each file was written in said disc device, and a file overwriting unit for selecting, from said disk device, a file whose date/time is prior to a current date/time for at least a predetermined time-period, said file overwriting unit reading the file thus selected from said disk device and overwriting the selected file thus read into said disk device.

2. The vehicle-mounted information processing apparatus as claimed in claim 1, further comprising storage means for storing information as to a time-limit by which said file overwriting unit should execute overwriting of the selected file stored in said disk device, the predetermined time-period being determined based on the time-limit.

3. The vehicle-mounted information processing apparatus as claimed in claim 1, further comprising:

temperature history managing means for managing information as to temperature history of an environment on which said processing apparatus is mounted, and a control unit for judging whether or not said file overwriting unit should start to overwrite the selected file based on the information as to the temperature history and the predetermined time-period.

4. The vehicle-mounted information processing apparatus as claimed in claim 1, further comprising:

a control unit for limiting an execution time of reading and overwriting of the selected filed by said file overwriting unit.

5. The vehicle-mounted information processing apparatus as claimed in claim 1, further comprising:

a control unit for controlling whether or not said file overwriting unit should start to execute reading and overwriting of the selected file according to a key position of a starter key switch of a vehicle on which said processing apparatus is mounted.

6. The vehicle-mounted information processing apparatus as claimed in claim 5, wherein said key switch of said vehicle comprises:

a first key position at which an engine of said vehicle is stopped, a second key position at which power is supplied from a power-source to accessories of said vehicle, said accessories including said vehicle-mounted information processing apparatus, and a third key position at which said engine of said vehicle is started, wherein said file overwriting unit executes reading and overwriting of the selected file when said starter key is at said first key position or said second key position.

7. The vehicle-mounted information processing apparatus as claimed in claim 5, wherein said file overwriting unit starts to execute reading and overwriting of the selected file at a predetermined time after said starter key switch has been switched to said first key position.

8. The vehicle-mounted information processing apparatus as claimed in claim 5, wherein said file overwriting unit starts to execute reading and overwriting of the selected file, if no access has been made to said magnetic disk device for a predetermined time after said starter key switch of said vehicle was set at said second key position.

9. The vehicle-mounted information processing apparatus as claimed in claim 5, wherein, after said starter key switch of said vehicle was switched to said first key position, reading and overwriting of the selected file being executed by said file overwriting unit is detected by a change in an electric current on a supply line of a power-source to said magnetic disk device.

10. A vehicle-mounted information processing apparatus, comprising:

a magnetic disk device storing a plurality of files each having a file name and a date/time at which said each file was written in said disk device, a file overwriting unit for selecting, from said disk drive, a file whose date/time is prior to a current date/time for at least a predetermined time-period, said file overwriting unit reading the file thus selected from said disk drive and overwriting the selected file thus read into said disk drive, and a control unit for causing said file overwriting unit to execute reading and overwriting of the selected file within a predetermined time after a presence of a passenger inside a vehicle is detected, said vehicle-mounted information processing apparatus being mounted on said vehicle.

11. A magnetic disk device used in an information processing apparatus mounted on a vehicle, comprising:

a magnetic disk for storing a plurality of files each having a file name and a date/time at which each file was written therein, and information as to a time-limit for indicating a time-limit by which said information processing apparatus should read a file from said magnetic disk and overwrite the file thus read into said magnetic disk, the file whose date/time is prior to a current date/time for at least a predetermined time-period being selected from said magnetic disk.

12. The magnetic disk device as claimed in claim 11, wherein the information as to the time-limit is stored in said magnetic disk as data.

13. The magnetic disk device as claimed in claim 11, wherein the information as to the time-limit is attached on said magnetic disk as visual data.

14. A control method of controlling a vehicle-mounted information processing apparatus including a magnetic disk device storing a plurality of file each having a file name and a date/time at which each file was written in said disk device, said control method comprising the steps of:

detecting a presence of a passenger inside a vehicle on which said vehicle-mounted information processing apparatus is mounted, and, within a predetermined time after the presence of said passenger inside said vehicle was detected, selecting, from said disk drive, a file whose date/time is prior to a current date/time for at least a predetermined time-period, reading the file thus selected from said disk drive, and overwriting the selected file thus read into said disk drive.

15. The control method as claimed in claim 14,
wherein the file is selected from a directory of said magnetic disk device when a starter key switch of said vehicle is at a lock position 16. The control method as claimed in claim 14, further comprising the steps of:
periodically detecting whether an in-chamber temperature of said vehicle exceeds a predetermined temperature, and executing said reading step and said overwriting step based on a result of said periodically detecting step and said predetermined time-period.

17. The control method as claimed in claim 14, wherein execution time of said reading step and said overwriting step is limited within a predetermined time.

18. The control method as claimed in claim 15,
wherein start of execution of said selecting step is made to wait for a predetermined time after a starter key switch of said vehicle was switched to a start-lock position.

19. The control method as claimed in claim 14,
wherein the file is selected from a directory of said magnetic disk device when a starter key switch of said vehicle is at a power-on key position for accessories of said vehicle.

20. The control method as claimed in claim 19, wherein execution of said selecting step is started where no access is made to said magnetic disk device for a predetermined time.

* * * * *